June 23, 1936.  J. W. BRYCE  2,045,435
RECORD CONTROLLED AND RECORD MAKING ACCOUNTING MACHINE
Filed Nov. 27, 1931  14 Sheets-Sheet 1
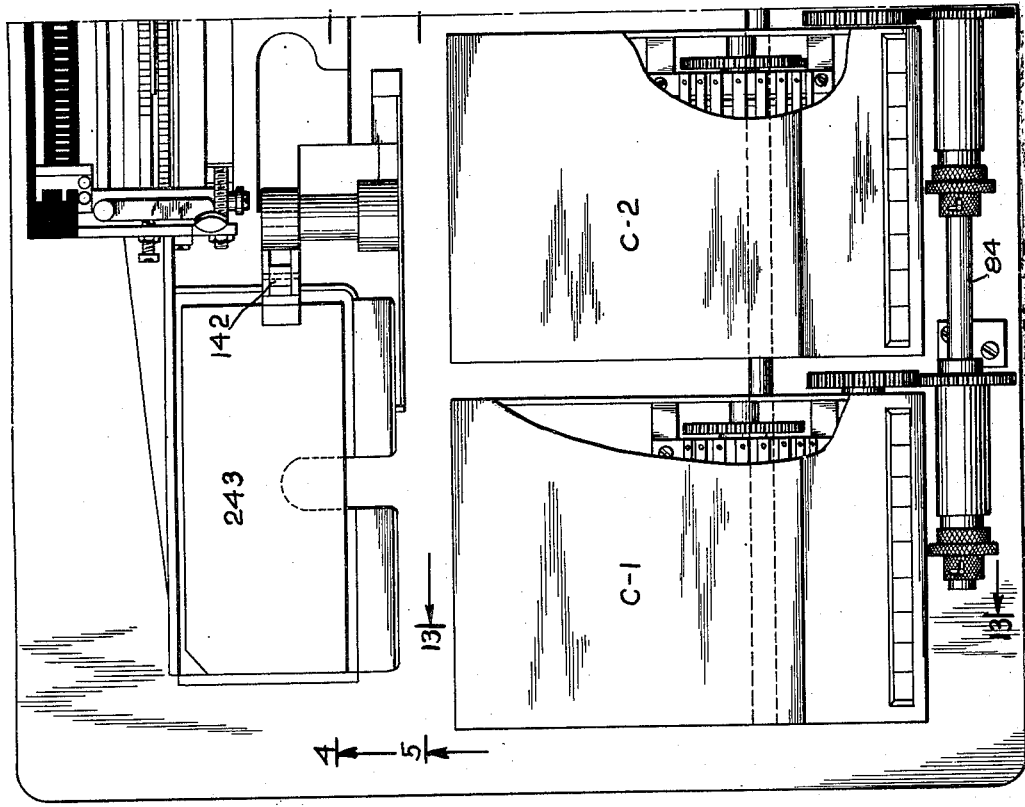
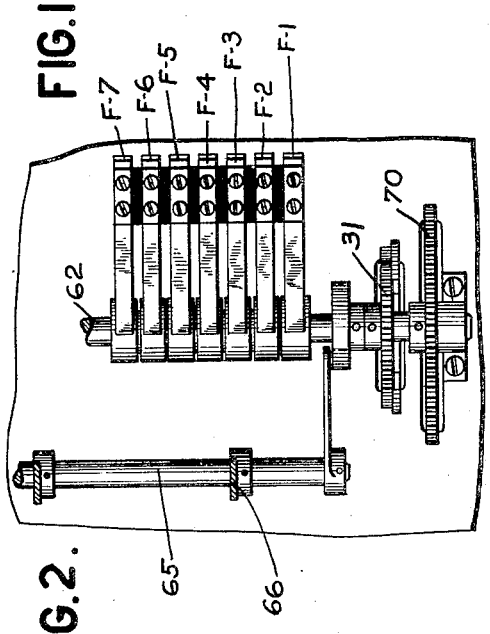
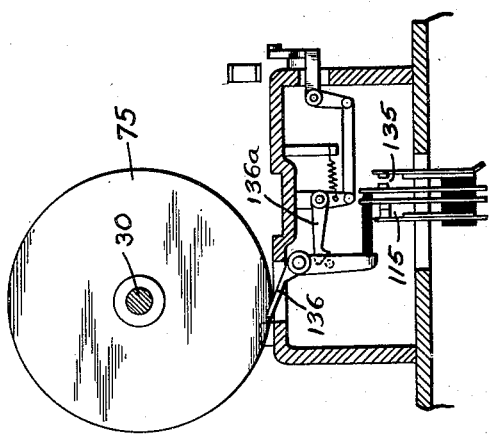
James W. Bryce
INVENTOR
BY Cooper, Kerr & Dunham
ATTORNEYS June 23, 1936.  J. W. BRYCE  2,045,435
RECORD CONTROLLED AND RECORD MAKING ACCOUNTING MACHINE
Filed Nov. 27, 1931  14 Sheets-Sheet 2

James W. Bryce
INVENTOR

BY his
Cooper, Kerr & Dunham
ATTORNEYS

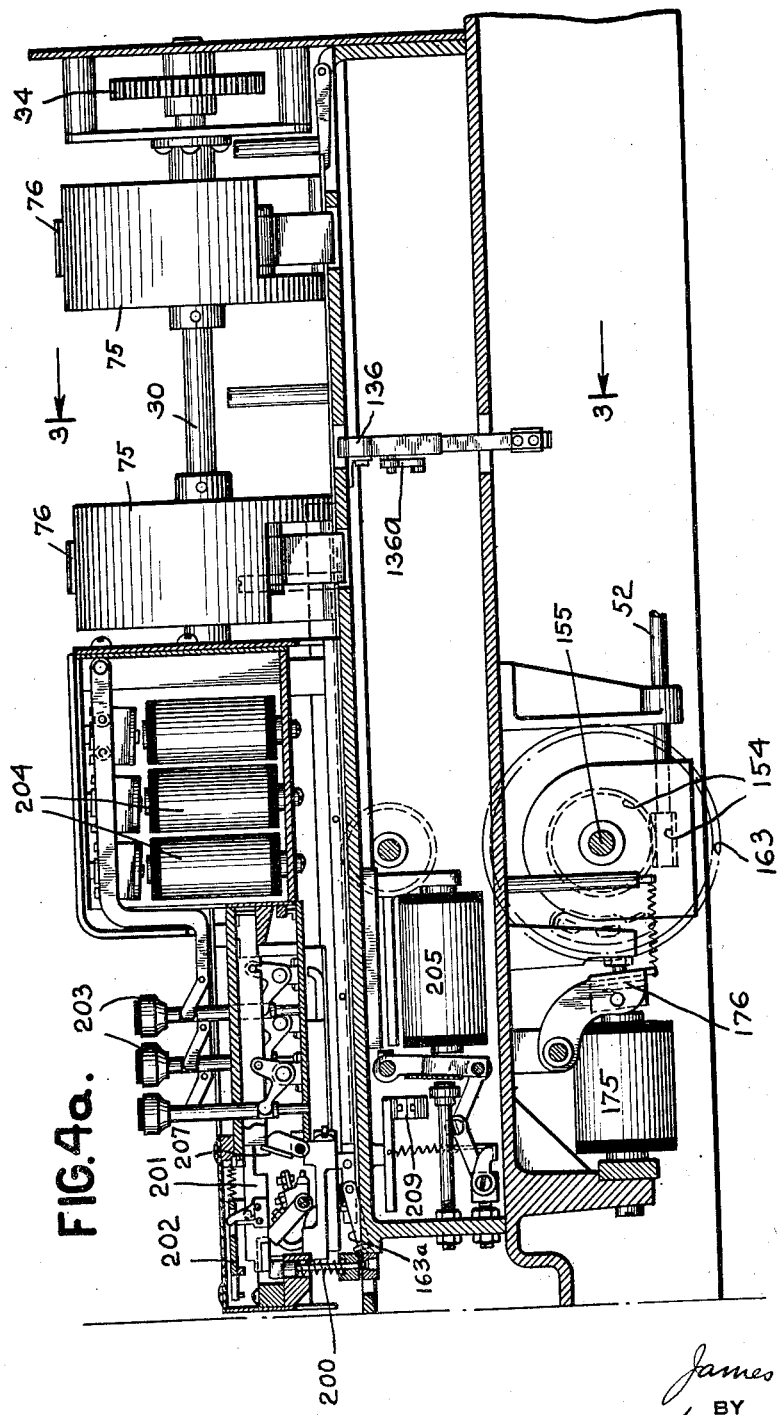

June 23, 1936.  J. W. BRYCE  2,045,435
RECORD CONTROLLED AND RECORD MAKING ACCOUNTING MACHINE
Filed Nov. 27, 1931   14 Sheets-Sheet 5
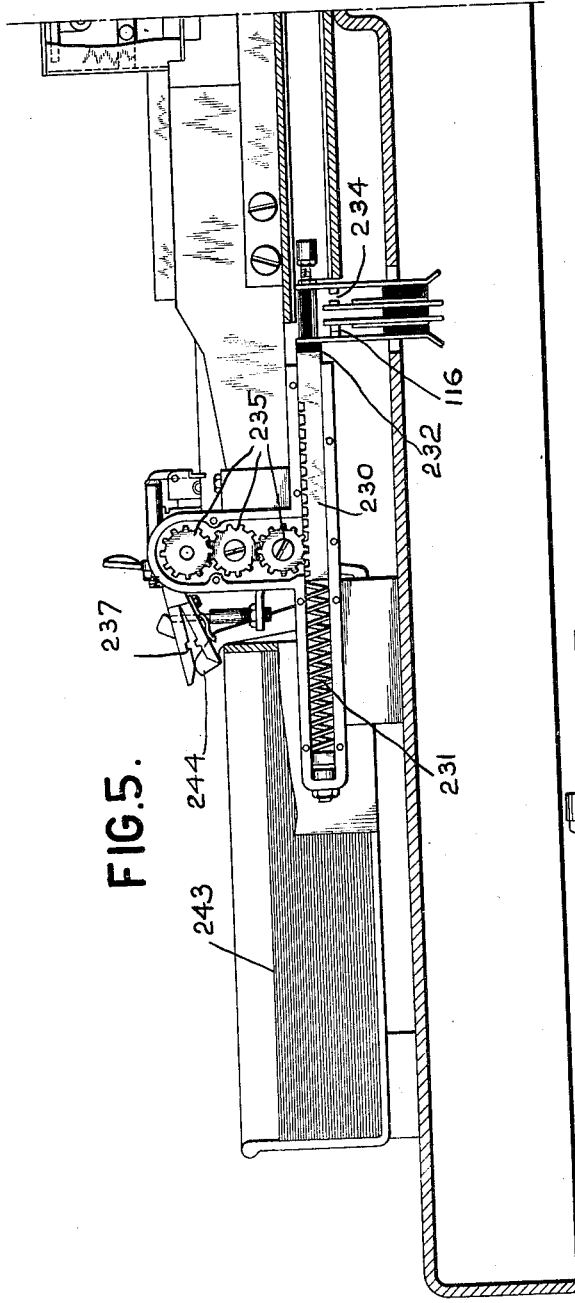
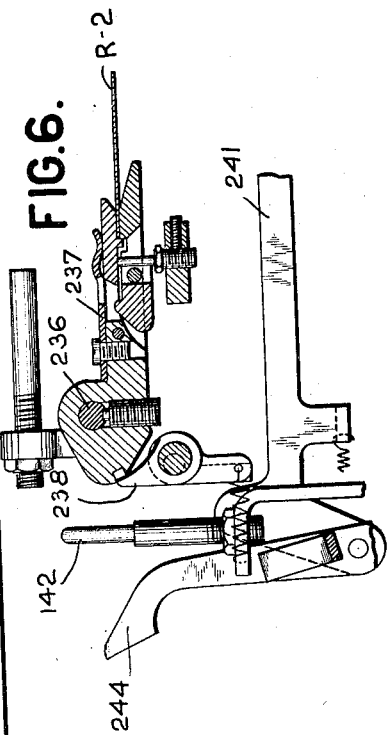
James W. Bryce
INVENTOR
BY Cooper, Kerr & Dunham
ATTORNEYS June 23, 1936. J. W. BRYCE 2,045,435
RECORD CONTROLLED AND RECORD MAKING ACCOUNTING MACHINE
Filed Nov. 27, 1931 14 Sheets-Sheet 6
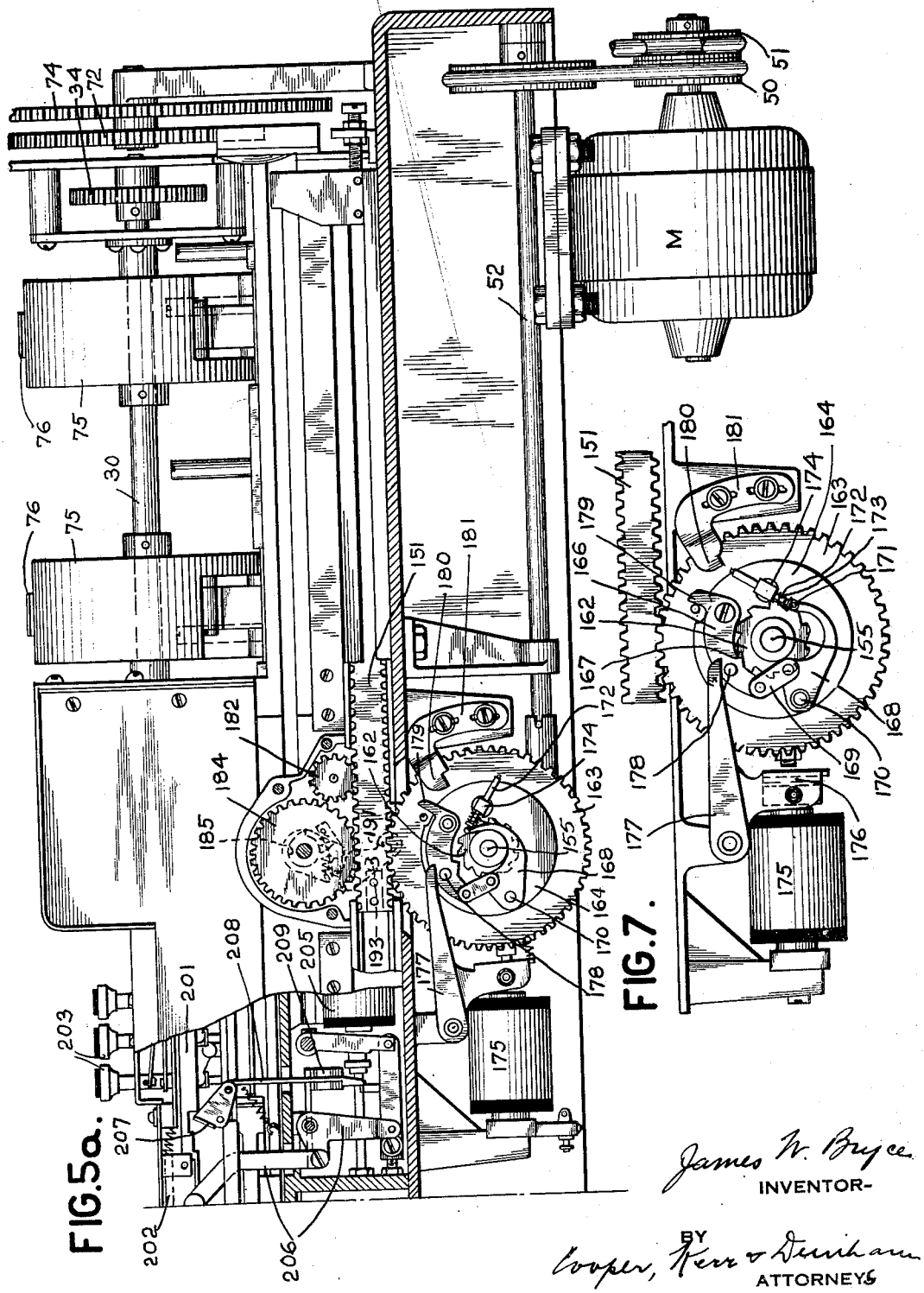
James W. Bryce
INVENTOR
BY Cooper, Kerr & Dunham
ATTORNEYS June 23, 1936.　　　　　J. W. BRYCE　　　　　2,045,435
RECORD CONTROLLED AND RECORD MAKING ACCOUNTING MACHINE
Filed Nov. 27, 1931　　　14 Sheets-Sheet 7
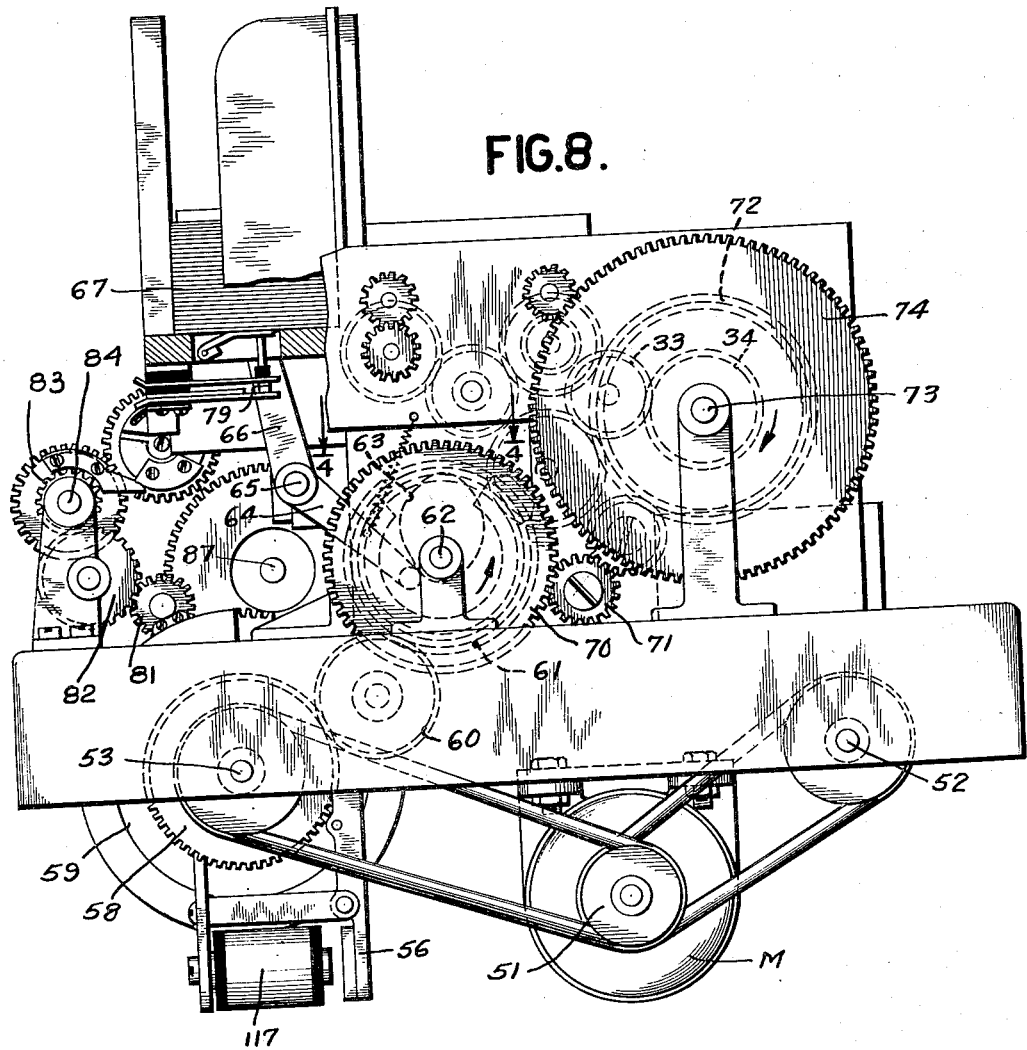
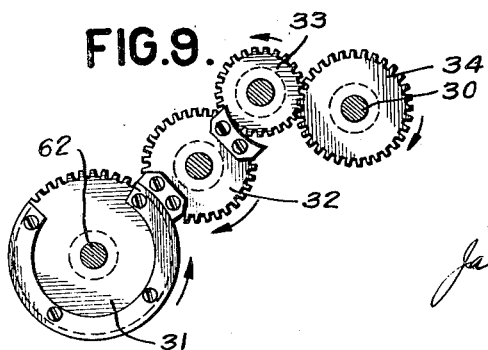
James W. Bryce
INVENTOR-
BY Cooper, Kerr & Dunham
ATTORNEYS June 23, 1936.    J. W. BRYCE    2,045,435
RECORD CONTROLLED AND RECORD MAKING ACCOUNTING MACHINE
Filed Nov. 27, 1931    14 Sheets-Sheet 8

James W. Bryce
INVENTOR

BY Cooper, Kerr & Dunham
ATTORNEYS

June 23, 1936.  J. W. BRYCE  2,045,435
RECORD CONTROLLED AND RECORD MAKING ACCOUNTING MACHINE
Filed Nov. 27, 1931  14 Sheets-Sheet 9

James W. Bryce
INVENTOR-

BY Cooper, Kerr & Dunham
ATTORNEYS

June 23, 1936.  J. W. BRYCE  2,045,435
RECORD CONTROLLED AND RECORD MAKING ACCOUNTING MACHINE
Filed Nov. 27, 1931   14 Sheets-Sheet 10

FIG.12a.

INVENTOR-
James W. Bryce
BY
Cooper, Kerr & Dunham
ATTORNEYS

June 23, 1936.    J. W. BRYCE    2,045,435
RECORD CONTROLLED AND RECORD MAKING ACCOUNTING MACHINE
Filed Nov. 27, 1931    14 Sheets-Sheet 11

INVENTOR-
James W. Bryce
BY
Cooper, Kerr & Dunham
ATTORNEYS

June 23, 1936.    J. W. BRYCE    2,045,435
RECORD CONTROLLED AND RECORD MAKING ACCOUNTING MACHINE
Filed Nov. 27, 1931    14 Sheets-Sheet 12

James W. Bryce
INVENTOR-

BY
Cooper, Kerr & Dunham
ATTORNEYS

June 23, 1936. J. W. BRYCE 2,045,435
RECORD CONTROLLED AND RECORD MAKING ACCOUNTING MACHINE
Filed Nov. 27, 1931 14 Sheets-Sheet 13
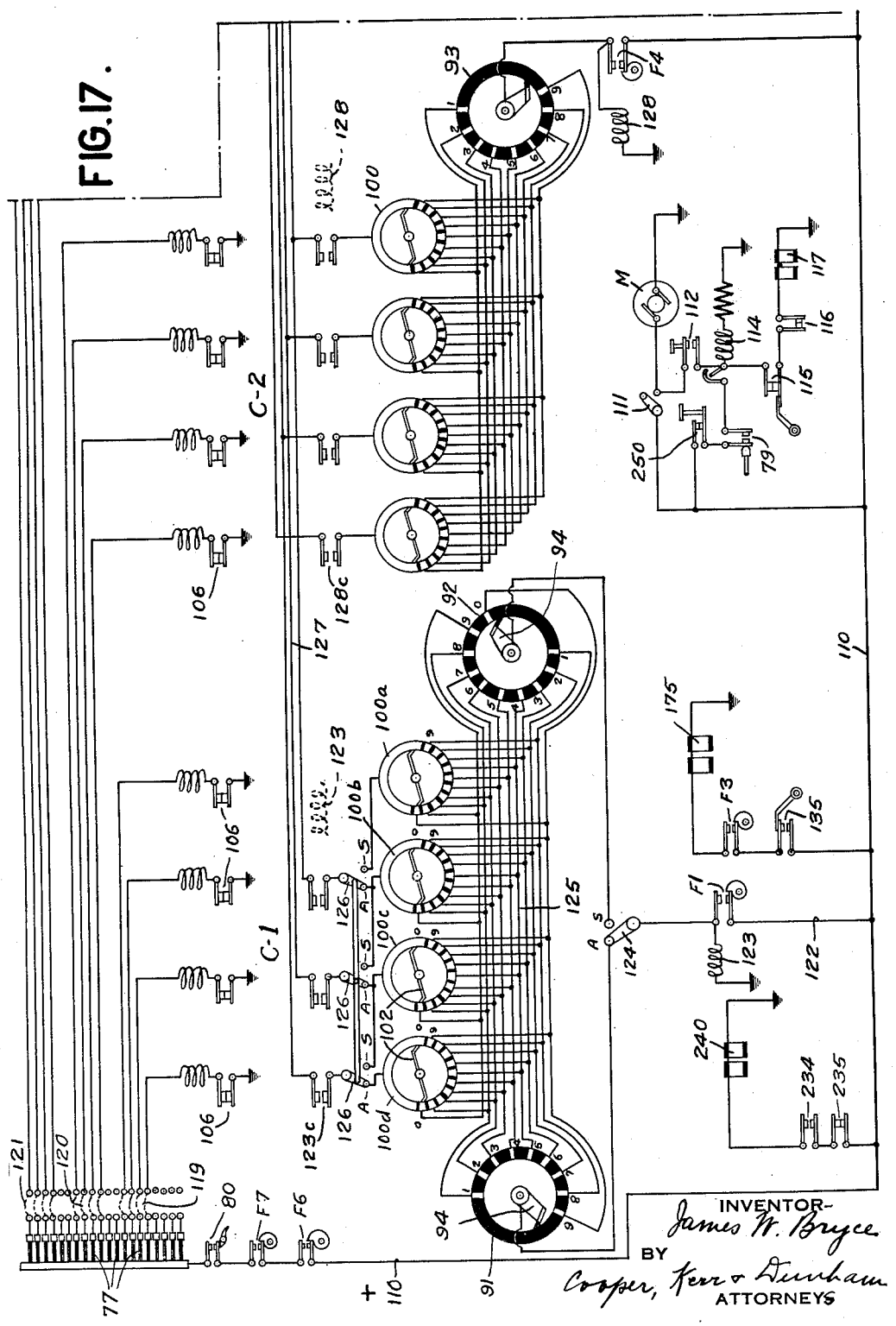

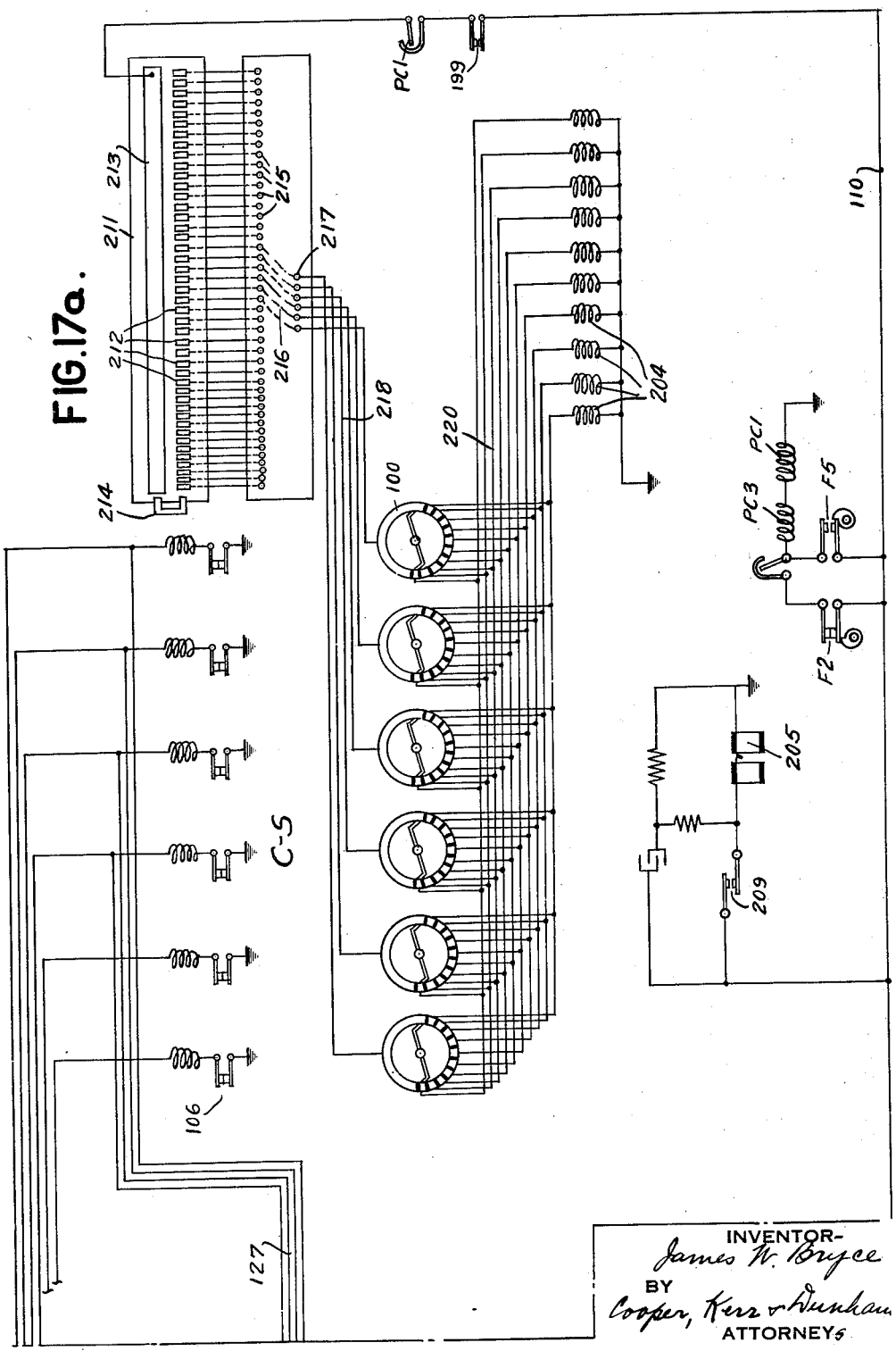

Patented June 23, 1936

2,045,435

UNITED STATES PATENT OFFICE 2,045,435

RECORD CONTROLLED AND RECORD MAKING ACCOUNTING MACHINE

James W. Bryce, Bloomfield, N. J., assignor, by mesne assignments, to International Business Machines Corporation, New York, N. Y., a corporation of New York Application November 27, 1931, Serial No. 577,439

15 Claims. (Cl. 235—92)

This invention relates to improvements in accounting machines and more particularly to improvements in record control and record making accounting machines.

In the tabulating machine art it is the common practice to add items derived from various fields and records concurrently and due to this concurrent reading of the items from various fields, difficulty has been experienced heretofore in effecting what is known as cross addition. While cross addition has heretofore been obtainable such cross addition has necessitated the employment of complicated mechanisms in the machine and has also greatly slowed down the operation of these already complex tabulating machines.

The present invention has for its object the provision of a machine of comparatively simple construction in which cross addition results may be more readily obtainable than heretofore.

A further object of the present invention resides in the provision of a construction which will enable cross-addition to be performed in a record controlled machine once and to render the cross added results available on subsequent re-runs of the records through tabulating machines regardless of re-sorts or re-grouping of the records.

A further object of the present invention resides in the provision of a machine which is adapted to separately handle each record and to derive from each record several separate item amounts into one amount and finally to record back on the record from which the separate item amounts were derived a record of this combined amount.

A further object of the present invention resides in the provision of a machine adapted for the performing of cross adding operations and for recording back upon a record a cross added amount in which provision is made for cross adding to obtain an algebraic sum of the separate items originally read from the record.

A further object of the present invention resides in the provision of a record controlled and record making accounting machine which is adapted to feed into the machine a series of records in succession, to read several items concurrently from each record as it is passed into the machine, then to combine the separate items thus read to obtain a cross addition which represents an algebraic summation of the items, thereafter to record back by punching on each record the algebraic record thus obtained and thereafter to automatically eject the completed record from the machine and to automatically reset the machine and to commence a similar operation upon a succeeding record.

Further and other objects will be hereinafter set forth in the accompanying specification and claims and shown in the drawings, which by way of illustration show what I now consider to be a preferred embodiment of my invention.

In the drawings:

Figures 1 and 1a taken together show a top plan view of the machine with certain parts broken away to show the interior construction;

Fig. 2 is a plan view showing certain of the contact mechanisms of the machine;

Fig. 3 is a view showing certain of the card lever contacts used in the machine. This view is substantially a sectional view taken on line 3—3 of Fig. 4a;

Figure 1A:
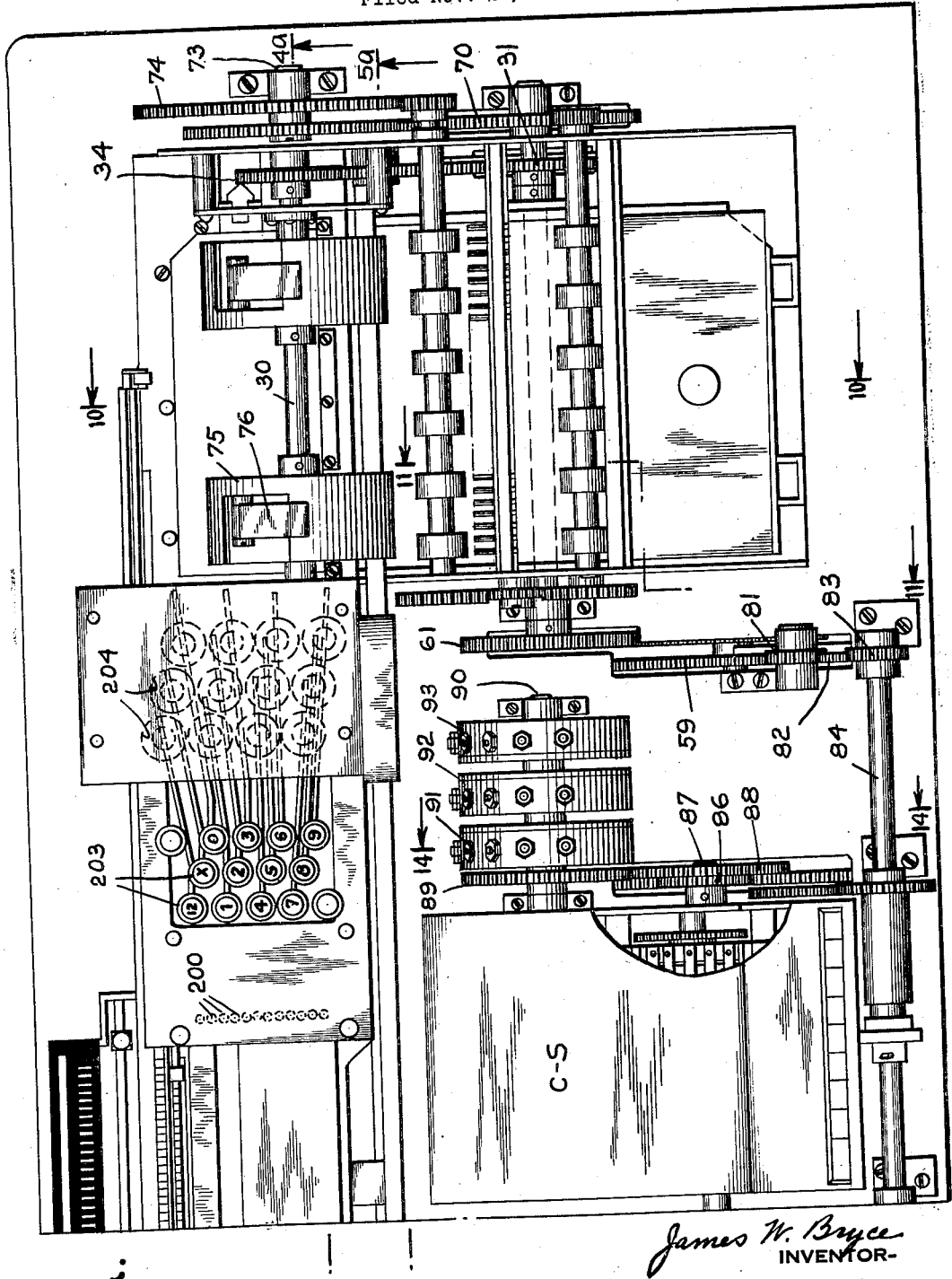
Figure 4:
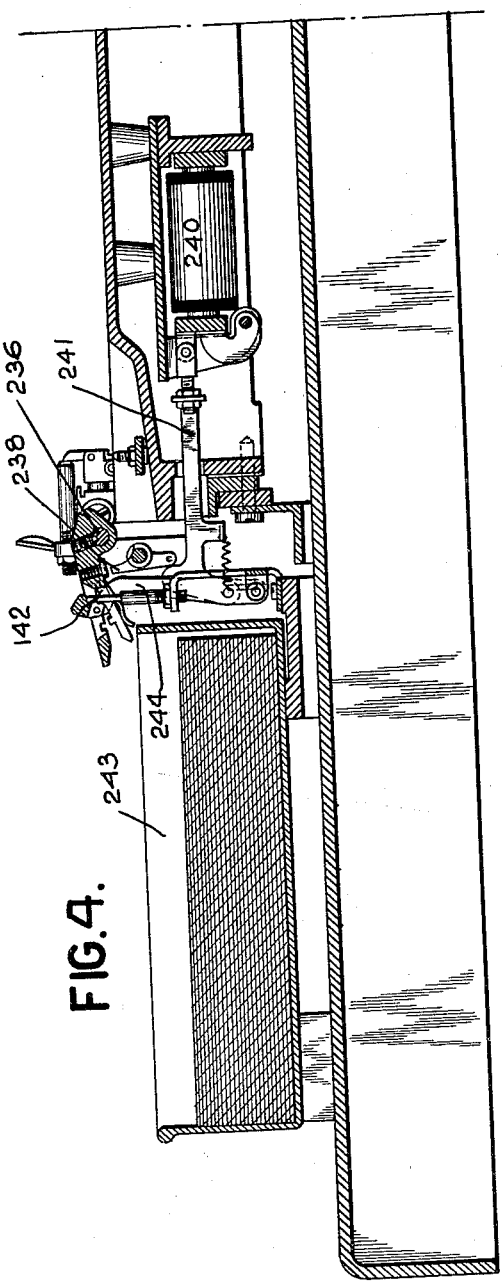
Figure 10:
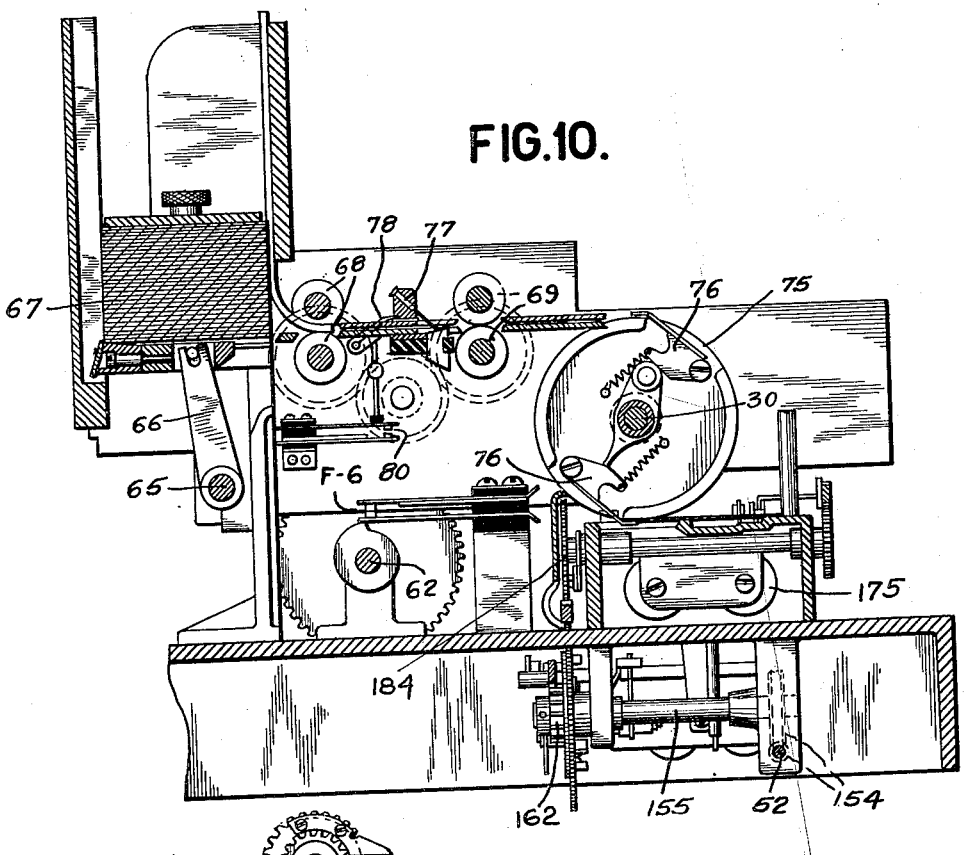
Figure 11:
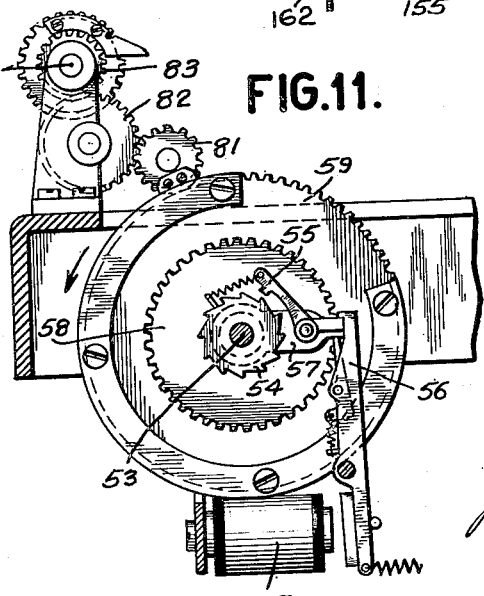
Figure 12:
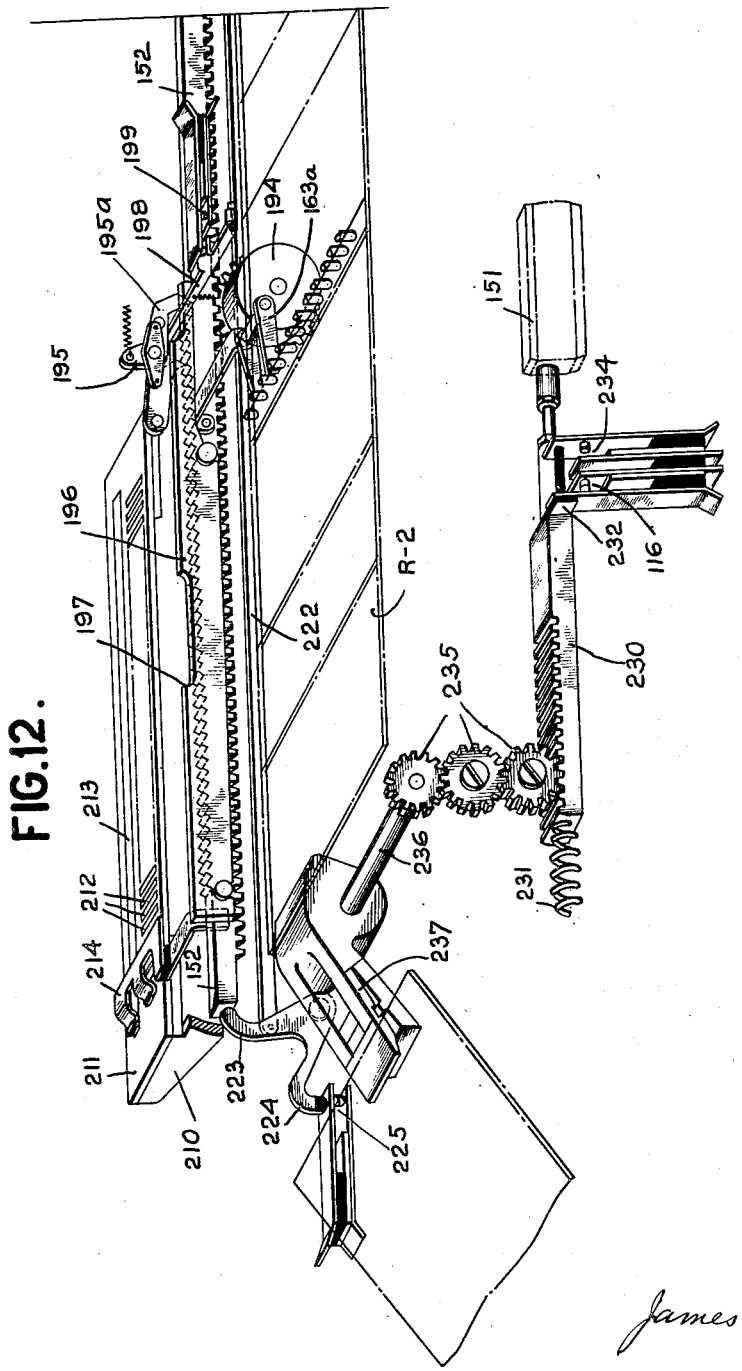
Figure 13:
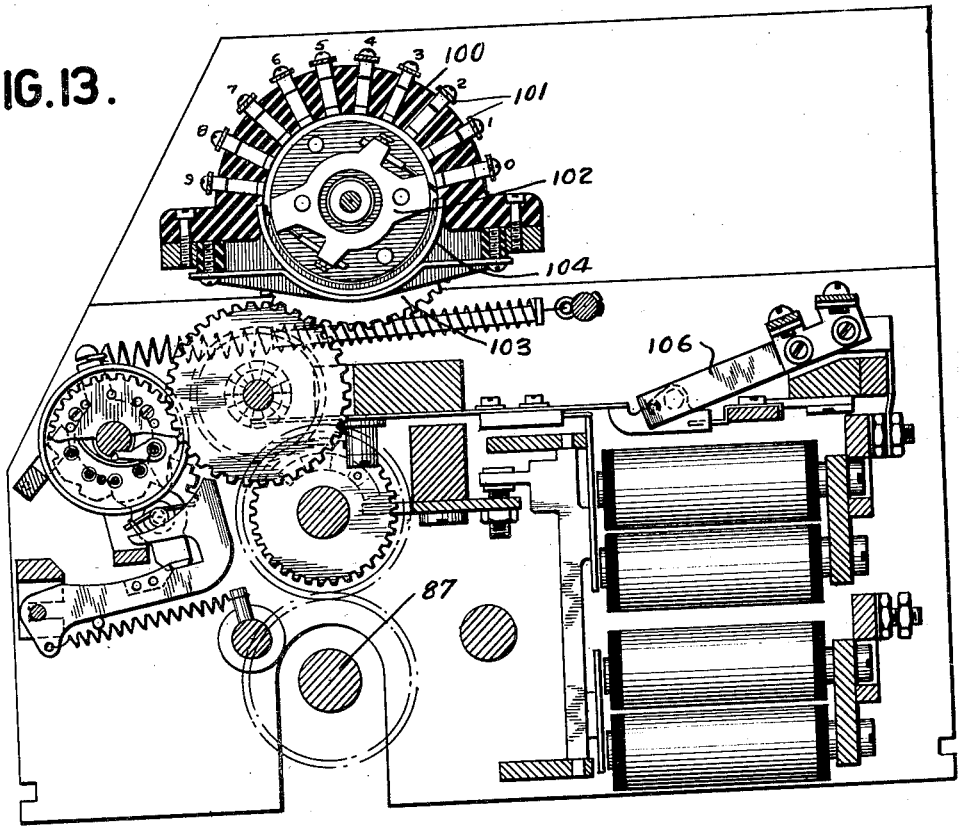
Figure 14:
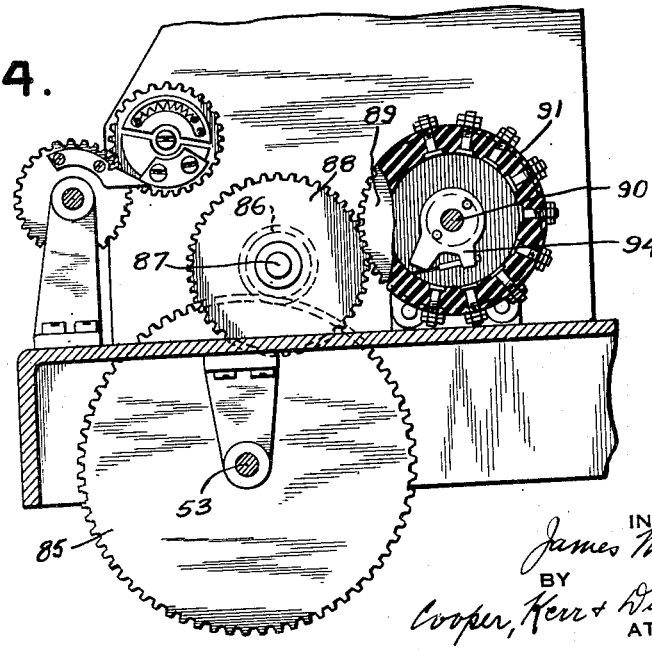
Figure 16:
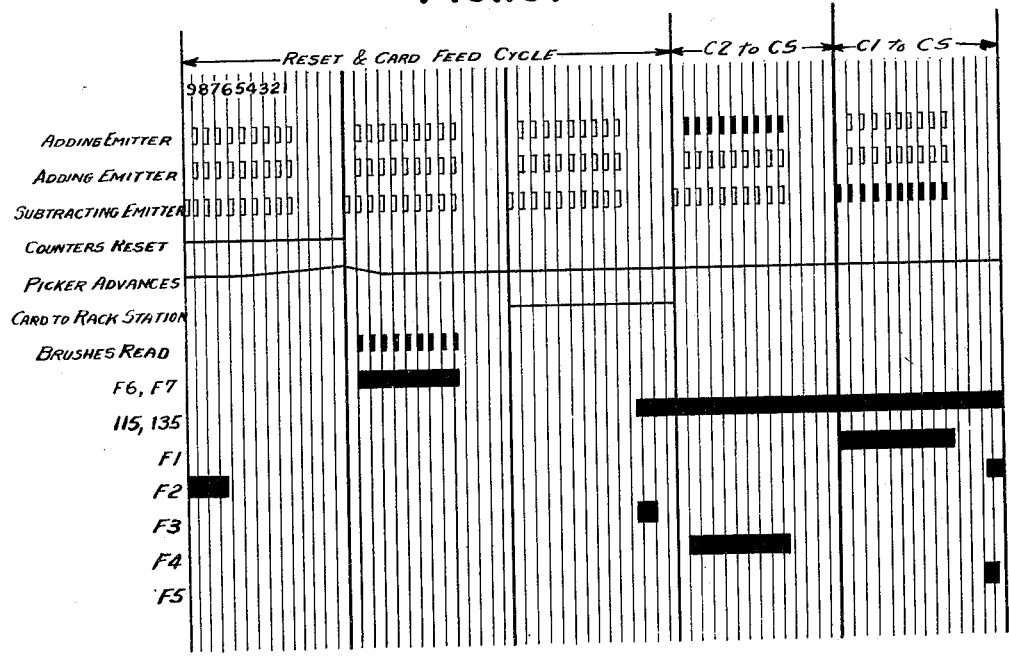
Figure 15:
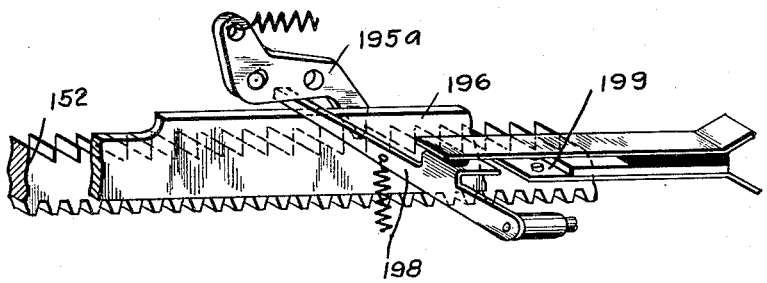

Figs. 4 and 4a taken together comprise substantially a transverse sectional view of the punching section of the machine, the view being taken substantially on line 4—4a of Figs. 1 and 1a and looking in the direction of the arrows;

Figs. 5 and 5a are similar views showing substantially a side elevational view of the punching section of the machine. This view is taken substantially on line 5—5a of Figs. 1 and 1a looking in the direction of the arrows;

Fig. 6 is an enlarged positional view of certain of the card ejector parts shown in Fig. 4;

Fig. 7 is a positional view of certain of the clutch operating parts shown in a different position in Fig. 5a;

Fig. 8 is an end view of the machine, the view being taken from the right of Fig. 1a and looking to the left;

Fig. 9 is a detail view showing the intermediate gear drive for the card transfer mechanism;

Fig. 10 is a transverse sectional view through the card handling and record reading section of the machine, the section being taken substantially on line 10—10 of Fig. 1a and looking in the direction of the arrows;

Fig. 11 is a detail sectional view taken in part below the base plate of the machine, the section being taken substantially on line 11—11 of Fig. 1a. This view shows the main clutch of the machine for controlling the feeding of the cards through the card reading station and the drive for resetting various parts of the machine;

Figs. 12 and 12a taken together show an isometric view of certain parts of the punching mechanism and certain related contact parts;

Fig. 13 is a sectional view through one of the counters or receiving devices of the machine. The section is taken substantially on line 13—13 of Fig. 1;

Fig. 14 is a detail sectional view taken through one of the emitters of the machine and showing the drive therefor. This section is taken substantially on line 14—14 of Fig. 1a looking in the direction of the arrows;

Fig. 15 is a detail view of the skip lifter and associated parts;

Fig. 16 is the timing chart of the machine; and

Figs. 17 and 17a taken together, show the circuit diagram of the machine.

The machine is intended to be driven by a constantly running driving motor M (Fig. 8). The motor shaft is provided with two pulleys 50 and 51 (see Fig. 5a). The former pulley 50 through a belt drives a punch operating shaft 52 and the pulley 51 through a belt drives a card reading and card computing section main drive shaft 53 (see Figs. 8 and 11). Shaft 53 extends across under the base of the machine and has fast to it a toothed member 54 of a one revolution clutch (see Fig. 11), which clutch comprises a pawl 55 adapted to be released to engage the toothed member 54 by the rocking of an armature 56. The pawl 55 is carried on a member 57 which in turn is fast to a gear 58 and to an intermittent gear 59. When the one revolution clutch is engaged, gear 58 through an idler 60 (Fig. 8) drives a gear 61 and rotates shaft 62. Shaft 62 has fast to it a cam 63 which cooperates with a cam follower 64 fast to a shaft 65 carrying picker actuating arms 66 (see also Fig. 10). Accordingly, upon the rocking of shaft 65 a card will be withdrawn from the supply magazine 67 and advanced into the bite of a pair of card feed rolls 68. Feed rolls 68 are in a gear train with other rolls 69 and rotate in unison therewith. This train of feed rolls is driven in the following manner:

Referring again to Fig. 8, shaft 62 has fast to it a gear 70 which through idlers 71 drives a gear 72 shown in dotted lines and mounted on stud 73. Also mounted on studs 73 and fixed to gear 72 is a gear 74 which drives the gear train for the feed rolls 68 and 69 previously referred to. Mounted on shaft 30 (Fig. 10) is a card transfer device 75 of conventional type provided with a pair of grippers 76. This device is driven by the following train of mechanism (see Figs. 8 and 9). Shaft 62 has mounted on it an intermittent gear 31 of the usual type, which gear is adapted on the last fifth of its revolution, to drive a gear 32 which gear in turn through idler 33 drives a gear 34 mounted fast on shaft 30 carrying the card transfer rolls 75. This card transfer device is similar to the usual stackers as heretofore used in tabulating machines. The card transfer device is so related and timed that a card emerging from rolls 69 (Fig. 10) is gripped by one of the grippers 76 and deposited in the tray of the punching section of the machine.

Shaft 62 makes one revolution for each card fed into the machine by the picker and gear 31 makes a corresponding complete revolution and during the last fifth of this revolution the card transfer device 75 is turned through one-half of a revolution to take a card which has emerged from the feed rolls 69 and place it in the tray of the punching section of the machine.

The card handling mechanism previously described, is adapted to traverse the card past a row of sensing brushes 77 (Fig. 10) of conventional form, which brushes are adapted to concurrently read multiple columnar perforated data from the card record. In addition to the sensing brushes, the card reading section of the machine is provided with a card lever 78, which is adapted, when a card is disposed thereunder, to close card lever contacts 80. Other card lever contacts 79 (Fig. 8) are disposed under the card magazine and are arranged to be closed whenever one or more cards remain therein. The sensing brushes 77 are connected by the usual connections to the usual plug board shown in the circuit diagram and which will be hereinafter more fully described.

Drive for computing section of the machine

Referring again to Fig. 11, the mutilated or Geneva gear 59 cooperates with a gear 81 and through idler gear 82 drives a gear 83 upon a reset shaft 84. It will be understood that during rotation of 59 in the direction of the arrow, the first motion of the gear is to unlock gear 81. Thereafter gear 59 drives 81 and imparts a rotational movement to the reset shaft 84. The reset shaft 84 is also shown in plan in Figs. 1 and 1a and as is customary in tabulating machines, individual reset drives and clutches are provided for each counter. These resetting devices are of the type shown in Lake United States Patent No. 1,600,414, dated September 21, 1926.

Counter drive

The shaft 53 (Fig. 8) extends through the gears 58 and 59, these gears being relatively rotatable upon the shaft 53 but each secured to each other and fixed to part 57 of the one revolution clutch. The extended part of shaft 53 beyond gears 58 and 59 (see Fig. 14) carries a gear 85 which is fixed to the shaft and which gear 85 meshes with and drives a gear 86. Gear 86 is disposed upon and fixed to the counter drive shaft 87. Gear 86 is also shown in Fig. 1a and is disposed upon the end of counter drive shaft 87. One revolution of gear 85 and of shaft 53 turns the counter drive shaft 87 through five revolutions. It will be understood that the counter drive shaft 87 extends through and drives all of the various counters and/or receiving devices of the machine. These will be briefly mentioned at this point as follows:

Referring to Figs. 1 and 1a three counters or receiving devices are shown. Obviously the invention is not limited to this particular number of counters or receiving devices. In its simplest embodiment C—1 and C—2 are counters or receiving devices adapted to receive item entries and CS is a summation counter adapted to receive entries in succession from C—1 and C—2. CS can also directly receive items. C—1 can be a converting counter in the event that it is desired to substract one entered item from the other entered item instead of to add the two entered items.

Emitter drive

Alongside the gear 86 (Figs. 1a and 14) there is another gear 88 which meshes with a gear 89 fixed on a shaft 90, which shaft constitutes an emitter brush drive shaft. As shown in Fig. 1a, three emitters 91, 92, and 93 are provided, each having a brush such as brush 94 (Fig. 14) cooperating therewith. Each emitter is of the conventional construction embodying a number of conducting spots or segments as shown in Fig. 14.

Cam contact controls

Referring to Fig. 2 shaft 62 is provided with a plurality of cams for certain cam contacts which are generally designated F and specifically designated F—1, F—2, F—3, F—4, F—5, F—6 and F—7. These cam contacts operate during the card feed cycle and while a card is traversing the sensing brush station.

Referring to Figs. 1 and 1a the counters or receiving devices C—1, C—2 and CS are of the usual construction used in tabulating machines with electromagnetically actuated clutches, etc. The readout mechanism in place of being of the conventional step cam variety is, however, of commutator form. A typical readout device of this sort is shown in Fig. 13 and comprises a ring 100 of insulating material provided with a proper number of conducting segment members or spots 101. Within the ring of insulating material is arranged to rotate a dual brush structure generally designated 102 and which brush structure is driven by gear 103 from the gear on the clutch shaft of the counter. The brush assemblage 102 receives its current supply from a common conducting segment 104. The current is fed in through 104 through one of the brushes, thence to the other brush, thence out through one of the segments depending upon the setting of the counter or receiving device. All of the various counters or receiving devices are provided with the usual relayless contacts 106 which open up upon energization of the counter magnets. The C—1 counter or receiving device is provided with ten conducting spots or segments and the same number of spots or segments are provided on the readout device for the CS counter. The C—2 counter on the other hand only requires nine segments but for simplicity of manufacture it can be provided with ten segments and one segment left unwired. On the circuit diagram, however, it is shown as provided with ten segments.

Before describing the drive of the punching mechanism or the operation of punching a summation of cross added amounts or cross subtracted amounts back upon the card, an explanation will be given of the entry of items into the machine and of the computing operations and the controls therefor. For this explanation, reference will be made to the circuit diagram.

Referring to the circuit diagram (Figs. 17 and 17a) the main supply of current is received over a wire marked "plus" and designated 110. The other side of the circuit is grounded and will have the usual and conventional ground designation. M is the driving motor and this motor is set in operation by closing the motor switch 111. To start the machine in operation, assuming that there are cards in the supply magazine 67 (Fig. 10), the start key 112 is depressed. Depression of the start key will establish a circuit through 111, through the start key contacts, through relay 114 and back to ground. The relay points of 114 will be closed and the circuit will also be established through 115 now closed, through contacts 116 now closed, through the card reading feed and reset clutch magnet 117 to ground. Magnet 117 is the magnet shown in Fig. 11 which controls the one revolution clutch which starts the card feed in action and resets the various counters and receiving devices of the machine. A card feed now ensues and a card is picked up by the picker and advanced to close card lever contacts 80 (Figs. 10 and 17). As stated previously, contacts 79 are closed whenever there are cards in the card magazine. At the proper time in the cycle of operation of the machine, current is supplied to contacts 80 by cam contact devices F—6 and F—7, which are those conventionally used in tabulating machines. Closing of contacts F—6 and F—7 and closure of card lever contacts 80 supplies current to the common bar 5 of the card sensing brushes and the card will then be read by the brushes in the usual manner and the readings of item entries from the card will be concurrently read in to the receiving devices C—1 and C—2 and also into CS if the machine is so plugged, and these items will be entered into the respective receiving devices. At the same time that the contacts 80 close, contacts 79 are likewise closed provided a card or cards are in the magazine so that a holding circuit is provided around the start key 112, which start key may now be released.

The entry circuits into the C—1 and C—2 and CS counters and receiving devices may be traced as follows: Via plug connections generally designated 119 to the counter magnets of the C—1 receiving device, through the 106 contacts previously referred to and back to ground. The entering operation in the C—1 counter will have set up the brushes generally designated 102 of the C—1 counter readout device and will have displaced the brushes to stand upon selected spots on each of the readout segments pertaining to the various orders. Entry of another item from the same card is effected into the C—2 counter via plug connections 120 and via the usual wires to the C—2 counter magnets and thence through the usual relayless counter contacts 106 and back to ground. There will be a corresponding setting of the item entered into the C—2 counter on the readout devices pertaining to this counter. Other plug connections 121 may be provided to enter an item from a card into the CS counter in the usual way and set up this item reading upon the CS readout devices.

In the operation of the machine, in some cases, merely two items will be derived from a card and no item entry will be directed into the CS counter from the card. The arrangement of the machine is flexible so that entries from the card can, for example, be directed into the C—2 and CS counters and these entries can be subsequently gathered together in CS or alternatively entries can be made into C—1 and C—2 and these two entries gathered together into CS or alternatively entries can be made into C—1 and C—2 and CS and then all of these amounts gathered together in CS.

Referring to the circuit diagram, the emitter 91 is an emitter utilized for cross adding operations. Emitter 92 is an emitter used for cross subtracting operations and the emitter 93 associated with counters C—2 is a cross adding type of emitter. Emitters 91 and 92 are arranged to selectively receive current through a circuit path traced as follows: from line 110 via wire 122, relay coil 123, contacts F—1 through a switch 124, which switch can be alternatively thrown to the A position to supply current to the emitter 91 or to be reversely thrown to the S position to supply current to the emitter 92. Current is thus supplied to the brush 94 of either emitter 91 or 92. On the C—1 counter the readout devices are generally designated 100 and as here shown, four of these readout devices are provided. The readout segments 100b, 100c, 100d, etc. have their respective segments connected to buses 125 in the usual manner so that when emitter brush 94 of emitter 91 is upon spot 9 of the emitter the similarly numbered spots of the readout devices 100b, 100c and 100d will be rendered live. The outgoing circuits from the foregoing readout devices 100b, 100c and 100d extend through the arms of gang switch 126 and through contacts 123c which are adapted to be closed upon the energization of coil 123 previously referred to. The contacts 123c pertaining to the 100b, 100c and 100d readout devices extends through a gang switch 126 which, when in the A position as shown, is adapted to place the 100b, 100c and 100d readout devices in circuit. This A position is for cross adding in which case 100b is for reading units, 100c for tens and 100d for hundreds and so on. For such addings the plug connections 119 are suitably placed to properly allocate the columns of the counter to the entry circuits. For cross subtracting the plug connections 119 are moved over one place so the entered amounts enter the columns in the counter so that 100a readout is associated with units entries, 100b the tens and 110c the hundreds and so on. For subtracting the 126 gang switch is thrown to the S position which coordinates lines 127 to the proper readout devices. Accordingly, on a cross summation where adding is involved the circuits to the brushes will be plugged up to the C—1 counter in such a manner that 100b is the units order of the counter. 100c is the tens order, 100d is the hundreds order and so on. Upon a subtracting operation the circuits are plugged up so that 100a is the units order, 100b is the tens order, 100c is the hundreds order and so on.

The conducting segment spots of emitter 92 are connected in a reverse manner to the buses 125, that is the 9 spot of emitter 92 is connected to the bus 125 which is in turn connected to the zero spots of the readout devices 100b, 100c and 100d. The interconnection of the segment spots of readout device 100a to the buses 125 is different however. It will be noted that the units segment spot of 100a is interconnected to the uppermost 125 bus line, which respectively extends to the ninth spot of the 92 emitter. Accordingly, emitter 92 emits impulses in a tens complementary relation to readout device 100a and emitter 92 emits impulses in a nines complementary relation to readout devices 100c and 100d. It will be assumed that an item is entered in the C—1 counter and another item is entered in the CS counter and that switch 124 is thrown to the A position as shown. At the proper time in the cycle of the operation of the machine F—1 will close, current will be supplied to the emitter 91, emitter 91 will emit its impulses on bus lines 125 and readings of the amount standing on the C—1 counter will be derived by the readout devices 100b, 100c and 100d and the impulses will flow over lines 127 to the counter magnets of the CS counter, causing the amount standing on counter C—1 to be added to the amount on counter CS. Transfer over from C—2 to CS is effected in a similar manner. Emitter 93 coming into action upon closure of contact F—4 and this transfer over operation occurs at a different time in the cycle of operation of the machine so that there is no interference of transfer of entry from the C—1 counter. The circuit to emitter 93 also extends through a relay coil 128, which closes 128c contacts to allow the impulses to flow out of the readout devices pertaining to C—2. If substracting operations are to be performed, switch 124 is thrown to the S position, then during the operation of the machine the complement of the amount standing on the C—1 counter will be transferred over to the CS counter so that there will be a subtraction of the amount derived from C—1 from the amount in CS and such subtraction will occur irrespective of whether or not other additive amounts flow to CS from C—2.

In passing, it may be mentioned that the machine is not intended for balancing with negative balances. It is assumed that it is to be used on positive balance operations only.

The foregoing description has described how entries from a common record into C—1, C—2 and/or CS can be cross added or summed up in the CS counter. It has also been explained how one entry, viz. that from the C—1 counter can be subtracted in lieu of being added to the gathered together amount. In practice any number of subtracting and adding counters can be employed, but for simplicity of illustration one has been shown here adapted for subtraction and the other counter C—2 has been shown as adapted solely for addition.

It may be explained that after a card has passed the sensing brushes 77 and after the amounts have been derived therefrom, such previously read card will be advanced by rolls 69 (Fig. 10) and gripped by one of the grippers 76 on the transfer roll 75 and carried around and deposited in the tray of the punching section of the machine. Deposit of the card by the transfer cylinder 75 in the punching section of the machine actuates card lever 136, opening up contacts 115 and closing contacts 135 (see Fig. 3).

Referring to the circuit diagram (Fig. 17) the opening of contacts 115 interrupts the circuit to the card feed clutch 117 and accordingly card feed is automatically suspended. Associated with card lever 136 (Fig. 3) is a latch device 136a which latch device holds the contacts 115 open and 135 closed until the latch is released in a manner to be subsequently explained. The machine is now ready to record back upon the record card from which the item or items were derived the cross summation or cross subtraction derived by the previous operation of the machine.

*Punching mechanism*

The punching mechanism will now be briefly described. In general this mechanism is of the form shown in Lee and Phillips United States Patent No. 1,772,186 and in Lee and Daly application Serial No. 391,874, filed September 11, 1929 (British Patent No. 362,529). Certain features are also shown in George F. Daly application Serial No. 461,993, filed June 18, 1930. In general it may be stated that the punching mechanism is adapted to receive a record card in the receiving tray as shown in the isometrical view in Fig. 12a, R designating the card in this position. In this position the card is in a proper position to be engaged by a picker 150 mounted on a bracket which is carried by card feed rack 151. On the movement of the card feed rack 151 to the left from its position shown in Fig. 12a, the card R is transferred by the picker and card feed rack to an intermediate position shown in dotted lines and designated R—1 on Fig. 12a. After the card reaches the R—1 position its further movement through the punching mechanism of the machine is effected by the spring actuated card carriage rack 152, which card carriage rack has a suitable pusher 163a attached to an arm carried thereby. Certain interconnecting mechanism is provided intermediate the card feed rack 151 and the card carriage rack 152 and certain other driving mechanism is provided for actuating the card feed rack 151.

Referring to Fig. 5a, 52 has been previously described as a constantly running shaft. Such shaft rotates at all times when the motor is in operation. This shaft 52 through a worm drive 154 (Figs. 12a, 10 and 4a) is adapted to drive a shaft 155, one end of which has secured thereto a ratchet shaped clutch element 162 (see Fig. 7). Loosely mounted on shaft 155 is a gear 163 meshing with teeth on the under side of rack 151 and to which gear is secured a disc 164.

Pivoted at 165 to disc 164 is an arm 166 having a clutch tooth 167. The free end of arm 166 is connected to a toggle plate 168 by a link 169. The end of the toggle plate 168 at a distance from its pivot 170 is articulated at 171 to a rod 172. The rod 172 is urged by a spring 173 and fits in an aperture in a pin 174 rotatably mounted on the disc 164. By virtue of this construction, rod 172 and plate 168 act as a toggle, spring 173 acting to impositively hold tooth 167 in or out of engagement with the clutch teeth of the ratchet wheel 162.

For the purpose of effecting the clutching action a magnet 175 is provided which when energized, attracts an armature 176 so that an arm 177 engaging a pin 178 of arm 166 will rock the tooth 167 into engagement with the ratchet wheel 162. This action shifts the toggle parts from the position shown in Fig. 5 to that shown in Fig. 7. The spring 173 acts to hold the clutch tooth in engagement with the ratchet teeth. Gear 163 will thereupon be driven in a counter-clockwise direction substantially a single revolution, thereby shifting rack 151 to the left.

At the termination of the counterclockwise movement of gear 163 a tail 179 of plate 166 will strike a projection 180 of a fixed plate 181 to effect the disengagement of the tooth 167 from the ratchet wheel 162 by a reversed action.

The rack 151 (see Fig. 12a) has inter-geared with it a small pinion 182 which has its shaft extending into the usual spring barrel 183. This spring barrel is similar to that shown in the Lee and Phillips patent referred to (see Fig. 30 of that patent).

Upon disengagement of the one revolution clutch shown in Fig. 7, the rack 151 will return to the right under the influence of the above spring. The previous movement of the rack 151 to the left has carried a record card from the R position to the R—1 position.

The driving train of the card carriage rack 152 will now be described. Rack 151 intermeshes with a gear 184 which is suitably supported for rotation and fixed to a member 185 (see Figs. 12a and 5a) having a single tooth in the plane of a pawl 186 pivoted to a plate 187 fixed to the shaft 188. At its other end shaft 188 is provided with a gear 189 meshing with the card carriage rack 152.

To control the clutching of the clutch device (i. e. the action of pawl 186 with member 185) a camming element 190 cooperates with a pin on the tail of the pawl 186. The rack 151 near its left hand end has fixed to it a block 192 which block is adapted to cooperate with the pin 193 carried by the pivoted camming element 190. With the rack 151 in extreme right hand position (see Figs. 5a and 12a) the pawl 186 will be disengaged from the clutch element 185. Upon the motion of the rack 151 to the left the block 192 will release the cam 190 and permit 186, under spring action, to engage 185. Thereafter rotational movement will be imparted to shaft 188 and through gear 189 the card carriage rack 152 will be traversed to the right. 152 by the mechanism just described, will be shifted to its extreme right hand position permitting the card pusher 163a to ride over the surface of the card under it and ultimately engage back of the trailing edge of the card at the R—1 position (Fig. 12a). 152 has associated with it a spring driving device generally designated 194. This spring barrel is fully described in the Lee and Phillips patent above referred to (see part 83, Fig. 9 of that patent). The rack 152 also has associated with it an escapement mechanism 195 having a dog 195a (see also Fig. 15). This escapement mechanism is of the general type shown in U. S. patent to Schaaff, No. 1,426,223 and is also similar to the escapement device provided in the Lee and Phillips patent above referred to. Removably secured to the card carriage rack 152 is a skip bar 196. This skip bar is of the general construction shown in the Lee and Phillips patent but differs in that the skip bar is provided with a notched portion 197 and according to the location and length of this notch a skip lifter lever 198 (see Fig. 15) is adapted to be allowed to descend or to remain in elevated position. When the skip lifter lever drops in the notch 197 it allows dog 195a of the escapement mechanism to cooperate with the upper teeth of the rack 152. Such dropping of the skip lifter lever 198 is also adapted to close contacts 199. It will be understood that with the skip lifter lever 198 riding on top of the skip lifter bar 196 that the escapement will be disabled so that the card carriage rack can traverse without stopping at each card column until the notch 197 is encountered. Thereafter an intermittent motion of the card carriage follows under spring action and such movement is continually controlled column by column under the control of the escapement mechanism until the skip lifter bar is again elevated by riding out at the end of notch 197.

It will be understood that skip bars of different configuration with the notches 197 of different lengths can be placed on the card carriage rack and in this way the intermittent motion and punching action can be brought about at selected points on the card according to the conformation of the skip bar.

It will be understood that with the above skip bar construction that after the card is in the R—1 position (Fig. 12a) and engaged by the pusher 163a of the card carriage rack 152 that immediately thereafter the card will be traversed with a continuous movement to the left until the skip bar notch 197 comes into action to stop the card carriage. The card will then be in a position for the beginning of punching.

The punching mechanism need not be fully described as the same is fully set forth in the Lee and Phillips patent above referred to. In brief it comprises a set of punches 200 (Fig. 4a) which punches are adapted to be depressed to perforate the card by the action of interposers 201 and operating bail 202. The interposers 201 are selectively thrust forward to bring about punching action either by means of the keys 203 or by the energization of punch selector magnets 204. Bail 202 is magnetically operated by means of a punch operating magnet 205. The connections to the bail 202 from the armature of the punching magnet are shown in Fig. 5a and are generally designated 206. Energization of magnet 205 is effected by means of a bail 207 (Fig. 5a) which bail is adapted to be rocked upon the thrusting forward of any of the interposers. Rocking of the bail 207 through a link 208 is adapted to close contacts 209 and bring about energization of magnet 205. As is customary in machines of this class the contacts 209 immediately open after the magnet 205 has attracted its armature and brought about its punching operation.

Referring to Fig. 12, alongside the card carriage rack 152 and fixed to the frame of the machine, is a member 210 carrying a plate of insulating material 211. Disposed in the plate of insulating material are a number of spots of conducting material 212 and alongside of these spots is a common strip of conducting material 213. A suitable bridging piece or brush member 214 is carried by the card carriage rack 152 and as the rack moves, the bridging piece 214 is displaced and establishes circuit connections from the common bar 213 to one of the spots 212, depending upon the columnar position of the card carriage rack 152 (see also Fig. 17a).

Referring to the circuit diagram (Fig. 17a) the individual spots 212 are wired to plug sockets generally designated 214 and by means of plugging connections 216 selected sockets 215 can be connected to sockets 217. Sockets 217 in turn are connected by conductors 218 to the readout devices pertaining to the CS counter. The conducting spots of the readout devices of the CS counter are all connected as shown, to a set of lines 220 which lead to the punch selector magnets 204 as shown.

Previous explanation has been made of how the card is transferred into the card tray of the punching mechanism. With the card in the card tray of the punching mechanism, the card lever 136 (Figs. 3 and 12) has closed contacts 135 and opened contacts 115. As previously explained these contacts are maintained in the relation above set forth by a latch 136a, which latch is interconnected by the linkage shown in Fig. 12a to a rod 222, which rod extends over to the left end of the card carriage rack 152. Here the rod 222 connects to a finger 223, which extends in back of the card carriage rack 152. 223 also has an extension 224 in cooperation with contacts 225 which are closed when the card carriage rack 152 is in the extreme left position and which are opened at all other times.

It will be understood that the latch 136a will not latch up the card lever 136 until rack 152 moves to the right so that the finger 223 can move to the right and follow the rack. Immediately upon this action taking place, however, contacts 115 and 135 will be latched up, 115 being latched open and 135 being latched closed. However, the presentation of a card into the tray of the punching section of the machine will close contacts 135 and open contacts 115. Cam contacts F—3 are disposed on shaft 62 (see Fig. 2) and these are arranged to close just after the card is placed in the tray. With the card in the tray of the punching section, contacts 135 will be closed. Closure of these contacts 135 (see the circuit diagram Fig. 17) will energize magnet 175. Magnet 175, it will be remembered, is the magnet which actuates the one revolution clutch shown in Figs. 5a and 7 and accordingly upon energization of 175 the card feed rack 151 will be displaced to the left and the card carriage rack 152 will be displaced to the right (Figs. 12 and 12a). Accordingly, the card will be displaced from the R position to the R—1 position (Fig. 12) and then will be picked up by the card pusher 163a and carried down to the position determined by the low portion of the skip bar 196. The opening of the contacts 115 (see Fig. 17) prevents further energization of the feed clutch magnet 117 and discontinues card feed until the punching operations have been completed.

It will be understood that the card feed rack 151 moves to its extreme left position when its one revolution clutch is energized. When the card feed rack 151 reaches such position, see the dotted line position on Fig. 12, this rack thrusts a rack 230 to the left compressing a spring 231. Bearing against a shoulder on rack 230 is a contact operating part 232. When 230 is thrust to the left, contacts 116 will be open and contacts 234 will close. The displacement of 230 to the extreme left position will also through the intermediate gears 235, rock a shaft 236 in a clockwise direction to bring an ejector clip assemblage 237 from the position shown in Figs. 12 and 5, to the position shown in Fig. 6. With the ejector clip assemblage 237 in displaced position this assemblage will be latched in such position by means of a latching pawl 238. With the ejector clip assemblage 237 thus latched up, energy will be stored in the spring 231 and thereafter the card feed rack 151 can move back to the right position shown in Fig. 12a.

The previous description has explained how the card is brought down to the position ready to receive a summation punching.

At the end of the transfer over of amounts from the C—1 and C—2 counters to the CS counter the cam contacts F—5 close. Closure of these contacts energizes relay PC—3 and coil PC—1 (Fig. 17a). Upon energization of PC—1 the contact points of PC—1 are closed and upon closure of the skip bar contacts 199 current flows from the high side of line 110 through 199 now closed, through contacts PC—1 now closed to the common contacting bar 213. The bridging piece 214 will have been previously traversed from the position shown in Fig. 17a to the extreme right hand position and then back to align with the proper spot 212 as determined by the skip bar. Current will now flow from 213 through one of the spots 212 and through the right hand plug connection 216 to the conductor of the group 218 which leads to the highest order of the readout devices 100 of the CS counter. Current will now flow through this highest order readout device through one of the lines 220 and will energize a single one of the punch selector magnets 204. In this way there will be a punching of the digit representing the highest order of the summation standing on the CS counter. Immediately upon the punching of this highest order numeral the escapement mechanism of the punch will operate, the switching device 214 will be moved one spot further to the left (Fig. 17a) and there will be an energization of the punch selector magnet under the control of the readout mechanism pertaining to the next lower order of the CS counter. This operation will continue until punching of the entire summation is completed. Following the punching of the units order amount of the summation, the skip lifter lever 198 will again be elevated releasing the escapement and allowing the card carriage rack 152 to be traversed under spring power to its extreme left position (Fig. 12). The card which has just been punched will then enter the jaws of the ejector assembly (see Fig.

6), R—2 indicating the card in this position. The traverse of member 152 to its extreme left position has reclosed contacts 225 which contacts were previously opened up. Reclosure of these contacts 225 establishes a circuit as follows (see circuit diagram Fig. 17) from high side of line 110 through contacts 225 now closed, through contacts 234 now closed, through ejector control magnet 240 and back to ground. Magnet 240 (see Fig. 4) has its armature connected to a link 241, which link upon being drawn to the right from the position shown in Fig. 6 is adapted to rock the pawl 238 in an anti-clockwise direction and release the ejector assembly 237 permitting shaft 236 to rock anti-clockwise under the power of the spring 231. The ejector assembly 237 then swings to the position shown in Fig. 4 and just as it reaches its extreme position a stop member 142 opens up the jaws of the ejector and permits the card which has been previously grasped thereby to drop into the discharge hopper 243. Discharge of the card from the ejector assembly is also aided by the action of the fingers 244 (see Fig. 6), which fingers are rocked in anti-clockwise direction following de-energization of the ejector magnet 240. De-energization of ejector magnet 240 is brought about by the opening up of contacts 234, which contacts it will be remembered, open up when the rack 230 moves to the right upon the swinging of the ejector to the position shown in Fig. 4. Concurrently, with the closure of contacts 225, the finger 223 (Fig. 12) will be rocked by the card carriage rack 152 to release the latch 136a and allow contacts 135 to reopen and 115 to reclose. Reclosure of the contacts 115 initiates a re-energization of the card feed clutch magnet 117. Such re-energization is prevented, however, until contacts 116 have reclosed, thus insuring that a card is ejected from the card ejector and the card ejector is restored to the position to receive a new card. Another card handling and summing up operation will now ensue and the operation will continue until the supply of cards in the card magazine is exhausted. At such time magazine contacts 79 will open and suspend further operation of the machine. Suspension of the operation at any time may also be effected by opening up the stop key contacts 250 (Fig. 17).

As is customary in these machines the opening up of contacts 79 or the opening up of contacts 250 will not stop the operation of the machine until the card reading summing up and punching operations have been completed on the card which is then in the machine.

*General operation and timing*

Referring to Fig. 16 it will be noted that on the timing diagram shown there are five counter cycles delineated. This is the minimum number of counter cycles for summation problems involving three counters, inasmuch as one counter cycle is required for each transferring over operation. During the first counter cycle which is shown as the left hand counter cycle of the timing diagram the counters are reset. During this same cycle, the picker is advancing the cards to the feed rolls and on the following counter cycle the card is sensed by the sensing brushes and the various item amounts entered into the respective counters or receiving devices C—1, C—2 and CS. On the following counter cycle the card is taken from the feed rolls and is transferred over to the tray of the punching section of the machine. After the card reaches the punching section of the machine the group of contacts 115 and 135 function. These contacts remain positioned throughout the succeeding summing up or transferring over cycle and while the card is being punched.

In the operation of the machine the feeding of the card to punching position may occur while the summing up steps are in progress. In fact this operation would occur in the early stages of the summing up or transferring over steps. As shown in the cycle diagram, two counter cycles are used for transferring over or summing up operations. It will be understood that the number of such cycles will depend upon the number of transfer over operations which are involved and with two transferring over operations which must be carried out in succession two counter cycles are required for such double transfers. With more than two transfers increased and additional counter cycles would necessarily have to be provided. Following the transferring over operations, contacts F—5 close and initiate a series of punching operations and at the termination of these punching operations a new card is handled.

Hereinafter in the claims when the term "cross-algebraically totalizing means" is used, the terminology will refer to cross-totalizing, whether involving a subtraction of a term or cross-totalizing involving mere adding of the terms or either. The present machine is capable of effecting totalizing of multiple terms from a common record by straight adding operations or by operations which involve subtraction and accordingly the term "algebraically totalizing" will be used in the broad sense to either refer to adding per se or to a totalizing operation which involves subtraction.

What I claim is:

1. A record controlled and record making accounting machine with counters and with means for concurrently sensing at least two sets of item amounts from separate fields of a common record, means for concurrently entering the items into separate counters of the machine, means for gathering together the separate entered items into a single accumulation in one counter, means for reading out the accumulation from said counter and for recording such accumulation back upon the record from which the separate items were derived so that the records carry a cross summation of the two or more amounts originally appearing thereon.

2. A record controlled and record making accounting machine including in combination means for feeding a series of records one by one in succession and automatically into the machine, means for sensing each record as it passes into the machine and for reading several separate item amounts therefrom, means for automatically gathering together the several separate entered item amounts from each record to obtain an algebraic sum of the separate item amounts, a punching apparatus, means effective after the separate item amounts have been read from each record for feeding the record to said punching apparatus, means automatically effective upon a completion of the gathering together operation for initiating a reading out operation and for controlling the punching apparatus to punch each record column by column with the results of the accumulation of the entered items and means automatically effective upon completion of the punching operation for initiating resetting of the machine and for ejecting the punched record from the punching apparatus.

3. A record controlled and record making accounting machine with a plurality of counters, with means for concurrently sensing at least two sets of item amounts in separate fields of the common record, means for concurrently entering the items so sensed into separate counters of the machine, readout devices associated with each of the several counters, impulse emitting means for emitting impulses through the readout means of a counter into another counter so that the items entered into the separate counters may be gathered together in a single gathered together amount in one counter, a readout means associated with the counter which receives the final gathered together amount, and means controlled by said readout means for recording the gathered together amount back upon the record from which the separate items were derived so that each record will finally have recorded thereupon the gathered together amount of the two or more amounts originally appearing thereon.

4. The invention set forth in claim 3 in which dual impulse emitting means are provided for selective association with a counter readout device, one emitter being provided for emitting direct impulses so that any gathering together amounts may be subtracted or added at the will of the operator.

5. An accounting machine adapted to handle records, each record having several separate items in various fields thereof, including a plurality of entry receiving means, entering means for each of the receiving means, means for actuating the entering means of a plurality of the entry receiving means under record control, means for thereafter actuating an entering means for a receiving means under the control of another receiving means to secure a cross-subtractive entry, and means for thereafter recording on said record under the control of the receiving means in which the result stands the result of the cross-subtraction of the items appearing on the record.

6. An accounting machine adapted to handle records, each record having several separate items in various fields thereof, including a plurality of entry receiving means, entering means for each of the receiving means, means for actuating a plurality of the entering means simultaneously under record control for concurrently entering several items from the common record therein, means for thereafter actuating an entering means for a receiving means under the control of another receiving means to secure a cross-entry and means for thereafter recording on said record under the control of the receiving means receiving the cross-entry the result of the cross-entry which comprises an algebraic sum of the items appearing on the record.

7. An accounting machine adapted to handle records, each record having several separate items in various fields thereof, including a plurality of entry receiving means, entering means for each of the receiving means actuated under record control to enter several items from the common record into the receiving means, means for thereafter actuating an entering means for a receiving means under the control of another receiving means, said last named means including means for selectively controlling cross-entry so that an amount derived from a receiving means may selectively represent a plus or minus quantity, and means effective after cross-entry for recording upon the record under the control of the receiving means upon which the result stands the result of the cross-entry.

8. An accounting machine adapted to handle records, each record having several separate items in various fields thereof, including a plurality of entry receiving means, entering means for each of the receiving means, means for actuating a plurality of the entering means under record control to enter items from the record into the receiving means, means for thereafter actuating an entering means for a receiving means under the control of another receiving means to secure a cross-entry, means for thereafter recording on said record under the control of the receiving means receiving the cross-entry the result of the cross-entry, record handling means having means to withdraw a record from a magazine and to feed such record and parts for advancing a record to and away from the recording means, means for thereafter clearing the entry receiving means, means called into action by the foregoing parts of handling means after recording for calling the record withdrawing means into operation to present a new record into a position into which amounts may be derived therefrom so that the record handling, cross-calculating and recording means may operate with each of a succession of separate records automatically, with the automatic presentation of the separate records into the machine, each record having two or more items thereon and each record being separately cross-added and the result of the cross-addition recorded upon each individual record.

9. An accounting machine adapted to handle records, each record having several separate items in various fields thereof, including a plurality of entry receiving means, entering means for each of the receiving means, means for actuating a plurality of the entering means under record control to enter several items from a common record into the respective receiving means, means for thereafter actuating an entering means for a receiving means under the control of another receiving means to secure a cross-entry, and means for thereafter recording on said record under the control of the receiving means which has upon it the result of the cross-entry, such result of the cross-entry, the aforesaid recording means for recording the cross-entry result on the record including devices which read out and record the result column by column.

10. An accounting machine adapted to handle records each record having several separate items in various fields thereof, including a plurality of entry receiving means for three separate items, entering means for each of the receiving means, means for actuating a plurality of entering means under record control so that the respective receiving means receive the three items from a common record, means for thereafter actuating an entering means for a receiving means under the control of another receiving means to secure one cross-entry, means for thereafter actuating an entering means for a receiving means under the control of another receiving means to secure another cross-entry, the aforesaid last two mentioned means including means to effect one cross-entry as a subtractive cross-entry and means to effect another cross-entry as an additive cross-entry and also including time controlling means to cause the different cross-entry operations at different times in the operation of the machine so that one cross-entry operation will not interfere with another.

11. An accounting machine adapted to handle records, each record having several separate items in various fields thereof, including three receiving means, entering means for each of the receiving means, means for actuating a plurality of the entering means simultaneously under record control to concurrently enter three separate items from a common record into the respective receiving means, means effective after such entries for thereafter actuating an entering means for a third receiving means under the control of another first receiving means to set up a sum of two items in the said third receiving means, means for thereafter actuating an entering means for said third receiving means under the control of the second receiving means whereby a final sum of all items is obtained in the third receiving means, and means for thereafter recording on said record, under the control of the third receiving means retaining the sum, such sum which is the sum of the three items on said record.

12. An accounting machine adapted to handle records, each record having several items in various fields thereof, including three entry receiving means, entering means for each of the receiving means, means for actuating the entering means for said three receiving means simultaneously under record control for concurrently entering three items from a common record into the respective receiving means, means for thereafter actuating an entering means for one of the receiving means under the control of one of the other receiving means to secure a cross-entry, the result of which comprises two items, means for thereafter actuating the entering means for the aforesaid receiving means under the control of the third receiving means to secure a further cross-entry, the result of which comprises three items and which is the final result, and means for thereafter recording on said record under the control of the receiving means which receives the cross-entries the final result.

13. An accounting machine adapted to handle records, each record having several separate items in various fields thereof, including a plurality of receiving means, entering means for each of the receiving means, means for actuating a plurality of the entering means under record control, means for thereafter actuating an entering means for a receiving means under the control of other receiving means to effect cross-entry operations, said last mentioned means including means to effect one cross-entry as a subtractive entry so that plus and minus quantities derived from a common record are gathered together by the foregoing cross-entry operations to secure an algebraic sum net result amount and means for thereafter recording on said record under the control of the receiving means in which the net result amount stands such net result amount.

14. An accounting machine adapted to handle records, each record having several separate items in various fields thereof, including a plurality of receiving means, entering means for each of the receiving means, means for actuating a plurality of the entering means under record control, means for thereafter actuating an entering means for a receiving means under the control of another receiving means to secure a subtractive cross-entry and for setting up as an algebraic sum of several items derived from a common record a net result amount in said receiving means, and means for thereafter recording on said record under the control of the receiving means in which the net result amount stands said net result amount.

15. An accounting machine adapted to handle records, each record having several separate items in various fields thereof, including a plurality of receiving means, entering means for each of the receiving means, means for actuating a plurality of the entering means under record control, means for thereafter actuating an entering means for a receiving means under the control of another receiving means to obtain a cross-entry which is a subtractive entry, means for actuating said last named entering means for said receiving means under the control of a different receiving means to secure a further additive cross-entry, whereby a final net algebraic sum of the entries derived from the common record is set up upon the receiving means, and means for thereafter recording on said record under the control of the receiving means in which the net result amount stands such net result amount.

JAMES W. BRYCE.